United States Patent [19]
Kikuchi

[11] Patent Number: 4,642,021
[45] Date of Patent: Feb. 10, 1987

[54] MANIPULATION ARM MECHANISM FOR AN INDUSTRIAL ROBOT

[75] Inventor: Makoto Kikuchi, Kariya, Japan

[73] Assignee: Toyoda Koki Kabushiki Kaisha, Kariya, Japan

[21] Appl. No.: 617,541

[22] Filed: Jun. 5, 1984

[30] Foreign Application Priority Data

Jun. 27, 1983 [JP] Japan ............................ 58-115494
Jun. 27, 1983 [JP] Japan ............................ 58-115495

[51] Int. Cl.4 ............................................. B25J 17/02
[52] U.S. Cl. ..................................... 414/735; 901/25; 901/26; 901/29; 74/392
[58] Field of Search ........................ 901/19, 23, 24, 25, 901/26, 27, 28, 29; 74/409, 392, 397, 665 A–665 E; 414/744 A, 751, 735

[56] References Cited

U.S. PATENT DOCUMENTS 2,995,046 8/1961 Mansachs ............................ 74/409
2,996,929 8/1961 Lazarowicz ........................ 74/409
4,068,536 1/1978 Stackhouse ........................ 74/417
4,402,234 9/1983 Malarz et al. ..................... 901/29 X

FOREIGN PATENT DOCUMENTS 5841996 9/1977 Japan .

Primary Examiner—Robert J. Spar
Assistant Examiner—Donald W. Underwood
Attorney, Agent, or Firm—Oblon, Fisher, Spivak, McClelland & Maier

[57] ABSTRACT

A manipulation arm mechanism for an industrial robot is provided with a pivotable arm in which a first shaft driven by a drive motor is carried for rotation about an axis extending in a longitudinal direction of the arm. The first shaft has secured to its front end a rear casing, on which a front casing is carried for rotation about an oblique axis slanted relative to the first shaft axis. A head mounting shaft capable of attaching thereto a working head such as, for example, a handling gripper is carried in the front casing to be rotable about an axis which extends in axial alignment with the first shaft axis only when the front casing is at a predetermined angular position about the oblique axis. Second and third shafts driven by respective drive motors pass through the first shaft and present into the rear casing their front ends, to which the front casing and the head mounting shaft are drivingly connected through gear trains respectively. Each axis of the second and third shafts is radially offset from the first shaft axis. This offset arrangement ensures a relatively large space reserved just behind the front casing, so that the working range of the working head about the oblique shaft can be broadened.

16 Claims, 15 Drawing Figures

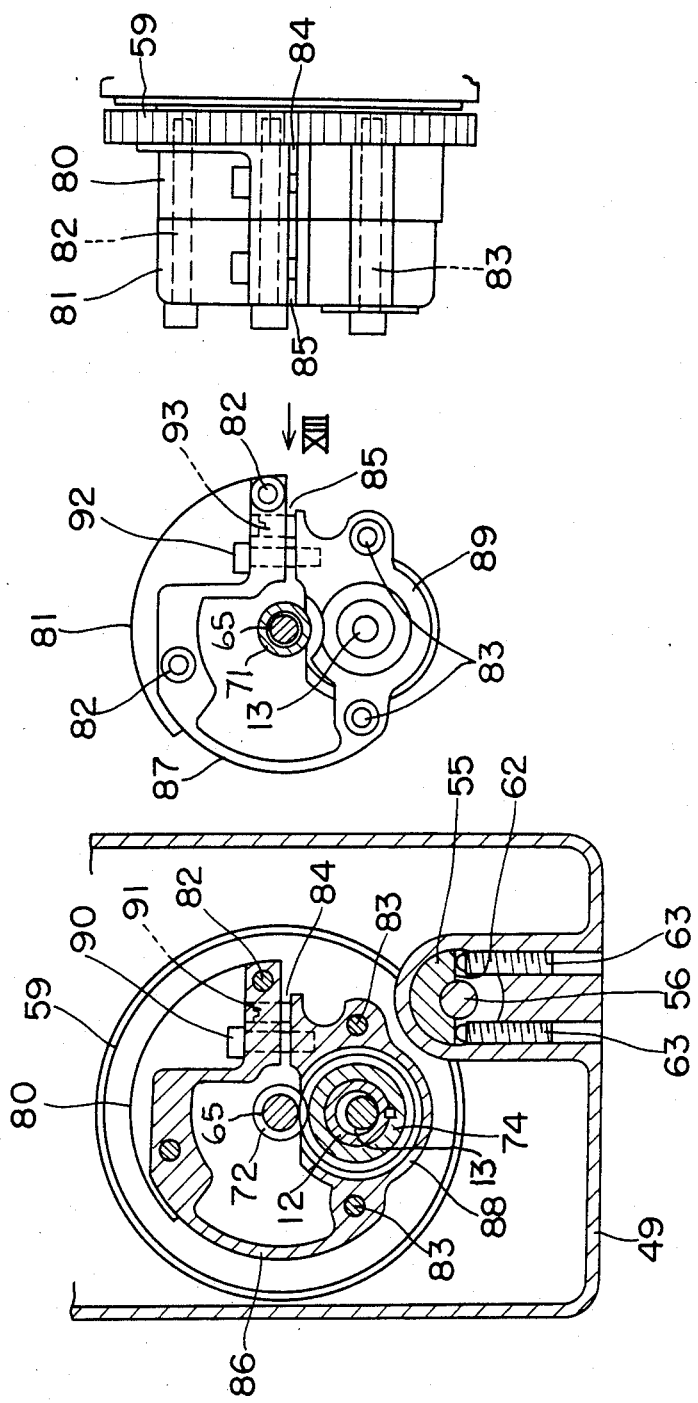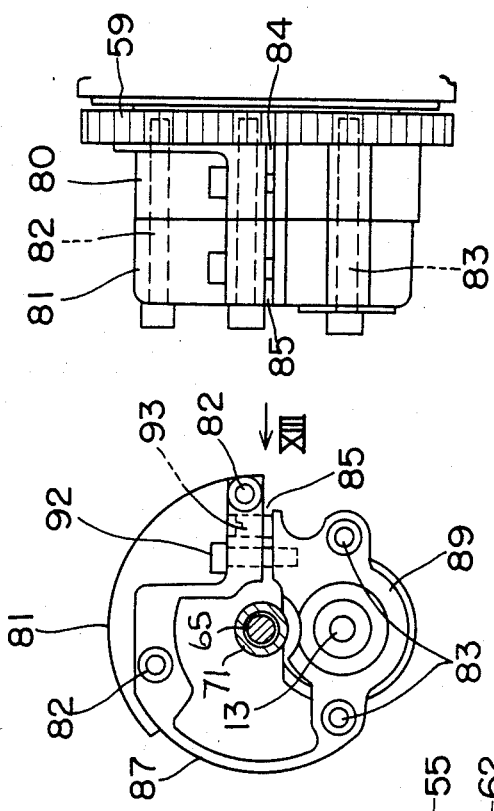

MANIPULATION ARM MECHANISM FOR AN INDUSTRIAL ROBOT

BACKGROUND OF THE INVENTION

1. Field of the Invention

The present invention relates in general to an industrial robot for use in various jobs such as, for example, material handling, part assembling, welding and the like. More particularly, it relates to a manipulation arm mechanism for such an industrial robot capable of moving a working head such as a handling gripper, an assembling tool, a welding unit or the like, along straight and circular paths for performing any of the various jobs.

2. Description of the Prior Art

In a known manipulation arm mechanism for an industrial robot, as shown in FIG. 1, a working head 1 such as, for example, a handling gripper, is rotatable about each of an axis L1 and an oblique axis L2 and thus, has a working range covering a hemisphere whose axis is in axial alignment with the axis L1. That is, first to third shafts 3–5 have a common axis L1, and the axis of the working head 1 is in axial alignment with the common axis L1 when the working head 1 is oriented toward the forward direction, as shown therein. This arrangement advantageously makes the preparation of a motion control program for the robot easy. However, the co-axial arrangement of the axes of the first to third shafts 3–5 causes the working range of the working head 1 about the axis which perpendicularly intersects the oblique axis L2 in the area where the rear casing meets the front casing to be limited to 180-degrees at most.

Another manipulation arm mechanism of the same type as above has also been known, wherein the working range of a working head about the oblique axis L2 is broadened up to 240-degrees. However, if an attempt is made to enlarge the angle ($\theta1$) which the oblique axis L2 makes with the rotational axis of the working head, then the result will be that the working head 1 is brought into the interference with the rear casing 6. Accordingly, it is impossible for said another manipulation are mechanism to cover a working range which is broader than 240 degrees.

Furthermore, in each of the aforementioned manipulation arm mechanisms, reduction gear trains are used to transmit rotations from drive motors respectively to the first to third shafts 3–5, and motion transmitting gear trains are used to transmit rotation from the second and third shafts 4 and 5 respectively to a front casing 7 and the working head 1. A backlash involved in each of these gear trains makes it difficult to precisely position the working head 1. Particularly, where a first shaft co-axially carries a second shaft therein which in turn, co-axially carries a third shaft therein as is true in each of the aforementioned prior art mechanisms, the second and third shafts can not be radially moved relative respectively to the first and second shafts, thus making it impossible to eliminate the backlash involved in each of the gear trains.

OBJECTS OF THE INVENTION

Accordingly, it is a principal object of the present invention to provide an improved manipulation arm mechanism capable of moving a working head within a broader working range than those of the prior art mechanisms.

Another object of the present invention is to provide an improved manipulation arm mechanism of the character set forth above wherein eccentricities of second and third shafts relative to the axis of a first shaft are arbitrarily chosen without being restrained by the diameter of the first shaft so that the design of gear trains used therein can be made easy.

A further object of the present invention is to provide an improved manipulation arm mechanism of the character set forth in the principal object which is capable of completely eliminating a gear backlash which might otherwise be involved in each of reduction gear trains between first to third shafts and respective drive motors thereof so that a working head can be precisely positioned to any commanded position.

SUMMARY OF THE INVENTION

Briefly, according to the present invention, there is provided a manipulation arm mechanism for an industrial robot, which comprises a first shaft rotatably carried in an arm of the industrial robot, a rear casing fixedly mounted on a front end of the first shaft, a front casing rotatably mounted on the rear casing for rotation about an oblique axis slanted relative to the axis of the first shaft, and a head mounting shaft carried by the front casing to be rotatable about an axis thereof which extends in axial alignment with the axis of the first shaft when oriented toward a forward direction. The head mounting shaft is provided for attaching a working head thereto. Second and third shafts are rotatably carried in the rear casing, with each front end thereof being offset from the axis of the first shaft. First to third drive devices are respectively connected to the first to third shafts, and first and second motion transmitting devices are provided for respectively transmitting rotations from the second and third shafts to the front casing and the head mounting shaft.

With this configuration, since each front end of the second and third shafts is radially offset from the axis of the first shaft, a relatively large space can be reserved immediately behind the front casing. This permits the working head to come as close to the rear casing or the first shaft as possible through rotation about the oblique axis, so that the working head can cover a broad working range.

BRIEF DESCRIPTION OF THE ACCOMPANYING DRAWINGS

The foregoing and other objects, features and attendant advantages of the present invention will be readily appreciated as the same becomes better understood by reference to the following detailed description of preferred embodiments, wherein like reference numerals designate identical or corresponding parts throughout the several views, and in which:

FIG. 11 is a cross-section of a backlash elimination mechanism, taken along the line XI—XI in FIG. 3;

FIG. 12 is a cross-section taken along the line XII—XII in FIG. 3;

FIG. 13 is an elevational view as viewed from the direction indicated by the arrow XIII in FIG. 12;

DETAILED DESCRIPTION OF THE PREFERRED EMBODIMENTS

Figure 2:
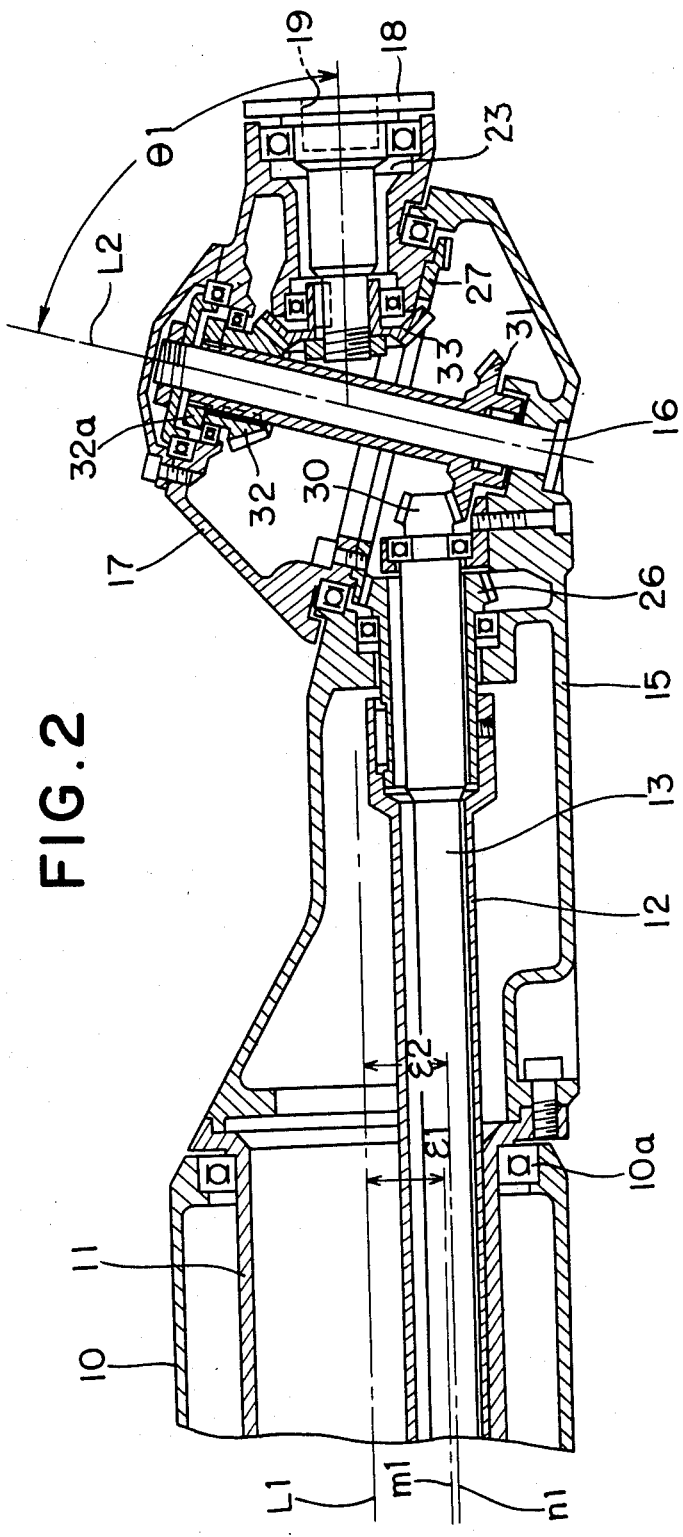
FIG. 2 is a sectional view of the front half of a manipulation arm mechanism for an industrial robot according to the present invention.

Referring now to the drawings and particularly to FIG. 2 thereof, a manipulation arm mechanism for an industrial robot according to the present invention is shown having a hollow arm 10, in which a first hollow shaft 11 is supported by means of a bearing 10a for rotation about its axis L1. The first hollow shaft 11 has secured to a front end thereof a rear casing 15, by which an oblique shaft 16 is rotatably carried with its axis L2 being slanted relative to the axis L1 of the first hollow shaft 11. A front casing 17 is carried by the oblique shaft 16 for rotation thereabout. A head mounting shaft 18 is rotatably received in the front casing 17 for rotation about its axis L3, which is in axial alignment with the first shaft axis L1 when the front casing 17 is at an original angular position to orient the head mounting shaft 18 toward the forward direction, as illustrated in FIG. 2. The head mounting shaft 18 is formed with a bore 19 at its front end for mounting a suitable working head WH (FIG. 4) such as a gripper unit, a welding unit or the like.

A second hollow shaft 12 passes through the first hollow shaft 11 and is carried by the rear casing 15 for rotation about its axis m1 which is radially eccentric or offset by an amount (e1) from the axis L1 of the first hollow shaft 11. The amount (e1) is slightly adjustable, as will be referred to later. The front end of the second hollow shaft 12 exends into the rear casing 15 and is rotationally connected with the front casing 17 through a gear train. More specifically, the second hollow shaft 12 has secured to the front end thereof a bevel gear 26, which is in meshing engagement with a bevel gear 27 secured to a lower surface of the front casing 17. Thus, rotation of the second hollow shaft 12 is transmitted via the bevel gears 26 and 27 to the front casing 17 so as to rotate the front casing 17 about the oblique shaft 16.

Further, passing through the second hollow shaft 12 is a third shaft 13, which is carried by the rear casing 15 for rotation about its axis n1 which is adjustably eccentric or offset by an amount (e2) from the axis L1 of the first hollow shaft 11. This third shaft 13 has secured to its front end a bevel gear 30, which is drivingly connected with a bevel gear 33 secured to the head mounting shaft 18 through a pair of bevel gears 31 and 32 bodily rotatable on the oblique shaft 16. Thus, rotation of the third shaft 13 causes the head mounting shaft 18 to rotate about its axis.

Figure 3:
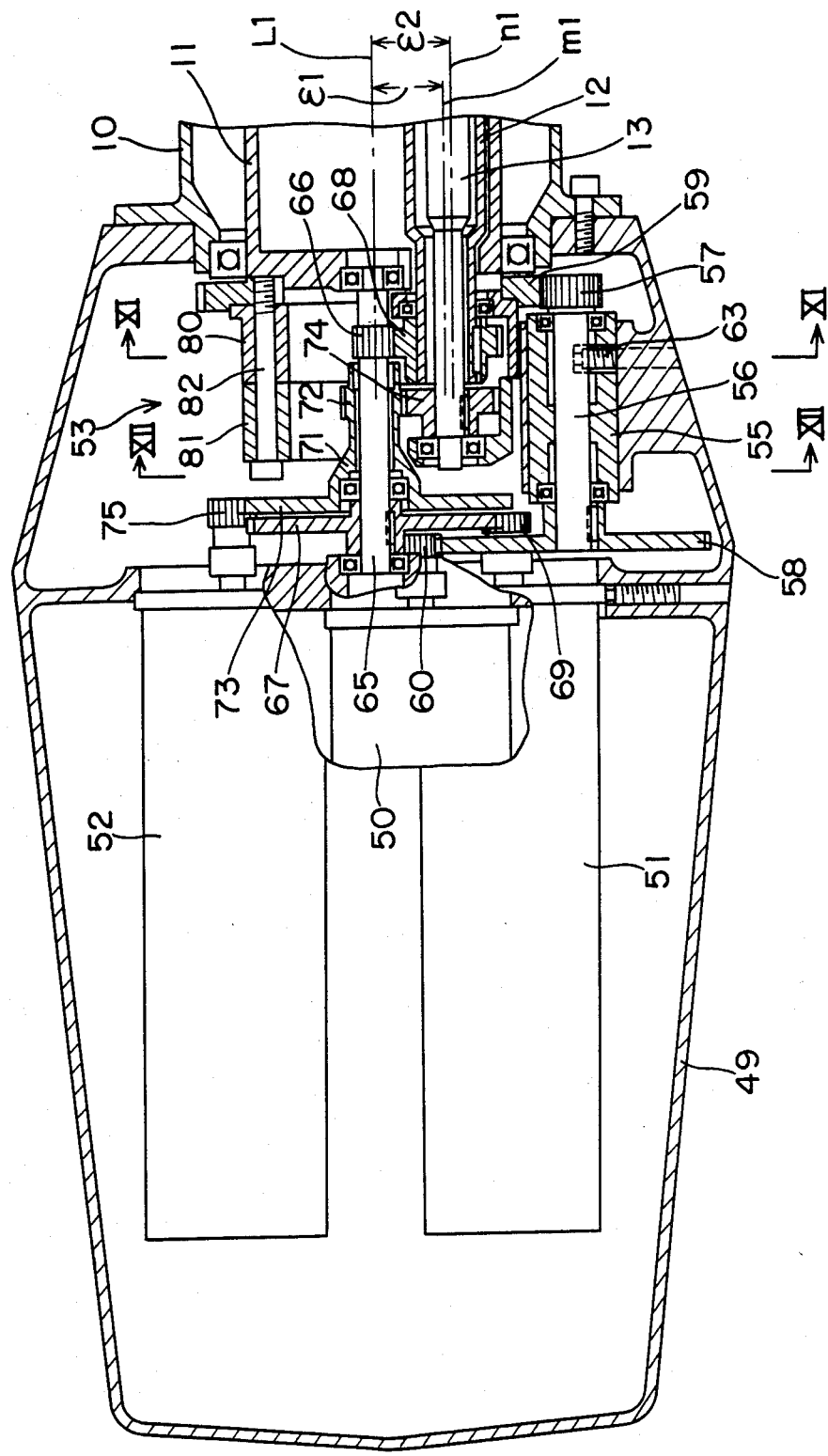
FIG. 3 is a sectional view of the rear half of the mechanism according to the present invention.

Referring next to FIG. 3, there is illustrted a drive mechanism for rotating the first to third shafts 11–13. Secured to a rear end of the hollow arm 10 is a housing 49, which incorporates therein first to third drive motors 50–52 and a reduction gear train 53. The reduction gear train 53 is composed of the combination of a plurality of gears and is designed to transmit rotations of the first to third drive motors 50–52 respectively to the first to third shafts 11–13 at predetermined gear ratios.

More specifically, within the housing 49, there is rotatably carried an eccentric sleeve 55, through which a transmission shaft 56 passes to be rotatable. The transmission shaft 56 has secured to its opposite ends gears 57 and 58. The gear 57 meshes with a gear 59 fixed on the first hollow shaft 11, and the gear 58 meshes with a gear 60 on an output shaft of the first drive motor 50. Consequently, rotation of the first drive motor 50 is transmitted to the first hollow shaft 11 so as to rotate the same about the axis L1 thereof.

Further, between the housing 49 and the first hollow shaft 11, a transmission shaft 65 is interposed to be in axial alignment with, and rotatable on, the axis L1 of the first hollow shaft 11. Gears 66 and 67 are fixed on the opposite ends of the transmission shaft 65. The gear 66 meshes with a gear 68 keyed on the second hollow shaft 12, and the gear 67 meshes with a gear 69 on an output shaft of the second drive motor 51. Accordingly, rotation of the second drive motor 51 is transmitted to the second hollow shaft 12 through the gears 69 and 67 and through the gears 66 and 68 constituting a planetary gear mechanism, whereby the second hollow shaft 12 can be rotated about the axis m1 thereof.

Rotatably carried on the transmission shaft 65 is a transmission sleeve 71, which is integrally formed with gears 72 and 73 at opposite ends thereof. These gears 72 and 73 mesh with gears 74 and 75 fixed on the third shaft 13 and an output shaft of the third drive motor 52, respectively. This enables rotation of the third drive motor 52 to be transmitted through the gears 75 and 73 and further through the gears 72 and 74 constituting another planetary gear mechanism, thereby rotating the third shaft 13 about its axis n1.

Reference numerals 80 and 81 denote bearing supports which are secured by means of a number of bolts 82 to the rear end of the first hollow shaft 11 in a tandem disposition. The bearing supports 80 and 81 have generally round external surfaces and rotatably carry rear ends of the second and third shafts 12 and 13 at parts thereof, respectively.

Operation of the apparatus as constructed above will be described hereafter. When the first drive motor 50 is operated, the rotation is transmitted at a speed reduced by the gears 60, 58, 57 and 59 to the first hollow shaft 11, which is thus rotated about its axis L1. The second drive motor 51, when operated, imparts rotation to the gears 69, 67, 66 and 68 so as to rotate the second hollow shaft 12 about the axis m1.

Rotation of the second hollow shaft 12 is transmitted through the bevel gears 26 and 27 to the front casing 17, whereby the same is rotated about the oblique axis L2. Accordingly, when full rotations of the first hollow shaft 11 and the front casing 17 are combined, the working head WH attached to the head mounting shaft 18 can be oriented toward all the directions except for a limited area indicated at RA in FIG. 4. This limited area RA may be defined to be a conical space which the working head WH makes around the axis L1 of the first hollow shaft 11 when the front casing 17 is located at an angular position spaced a half revolution from the original position where the axis of the head mounting shaft 18 is in axial alignment with the axis L1 of the first hollow shaft 11.

Figure 4:
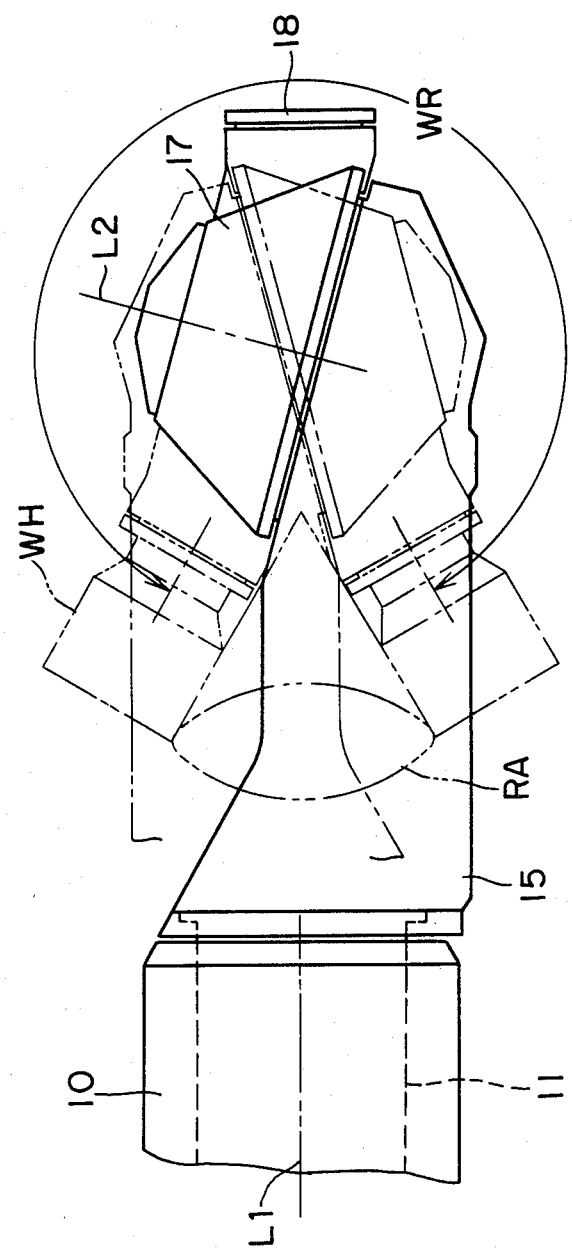
FIG. 4 is an explanatory view showing the working range of a working head WH attachable to a head mounting shaft 18.

Further, the third drive motor 52, when operated, rotates the gears 75, 73, 72 and 74, through which the third shaft 13 is rotated about the axis n1. Rotation of the third shaft 13 is transmitted to the head mounting shaft 18 at a speed reduced by the bevel gears 30-33, whereby the working head WH is rotated about the axis of the head mounting shaft 18 in each direction toward which the mounting shaft 18 is oriented. In each embodiment described herein, since the angle ($\theta$1) which the oblique axis L2 makes with the axis of the head mounting shaft 18 within a plane including the axis L1 of the first hollow shaft 11 is chosen to be seventy-five (75) degrees, the working head WH covers a working range of three-hundreds (300) degrees about the axis which perpendicularly intersects the oblique axis L2 in the area where the rear casing 15 meets the front casing 17, as shown in FIG. 4.

Figure 5:
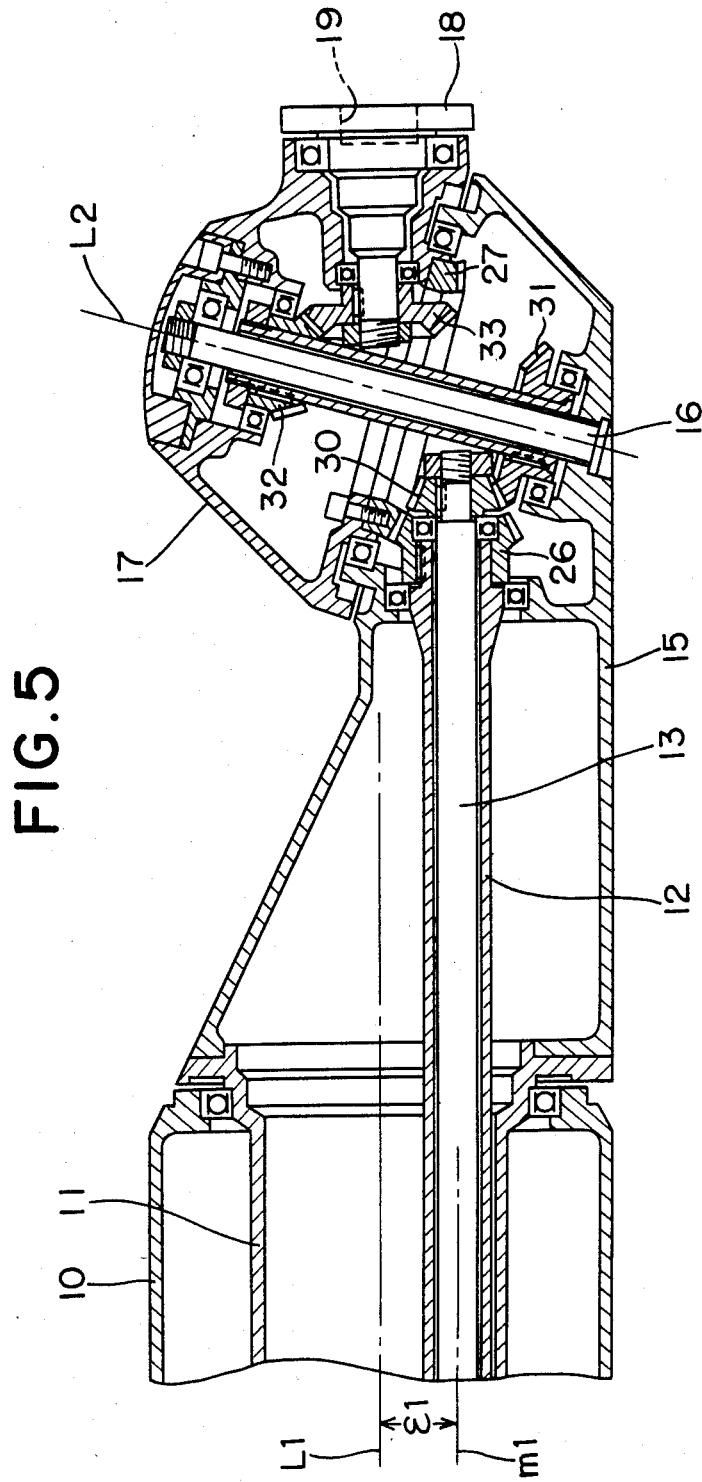
FIG. 5 is a sectional view of the front half of another manipulation arm mechanism constituting a second embodiment of the present invention.

Although in this particular embodiment, the axes m1 and n1 of the second and third shafts 12 and 13 are eccentric from each other for the purpose of eliminating backlashes between the gears, such arrangement is not essential to the present invention. For example, in a second embodiment shown in FIG. 5, the present invention is practiced in such a manner that the second and third shafts 12 and 13 are co-axially disposed for independent rotation about a common axis m1 which is offset by the amount (e1) from the axis L1 of the first hollow shaft 11.

Figure 6:
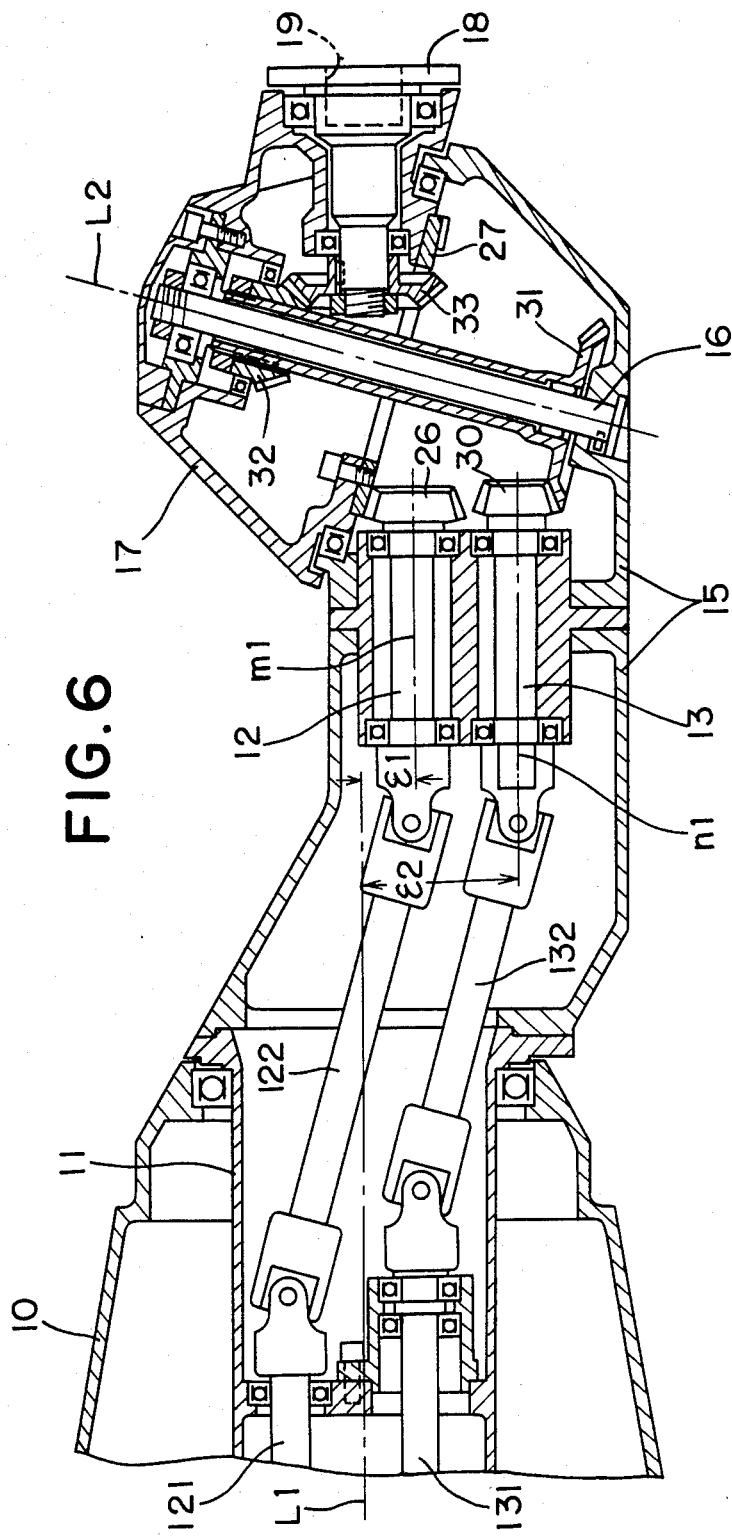
FIG. 6 is a sectional view of the front half of a still another manipulation are mechanism constituting a third embodiment of the present invention.
Figure 7:
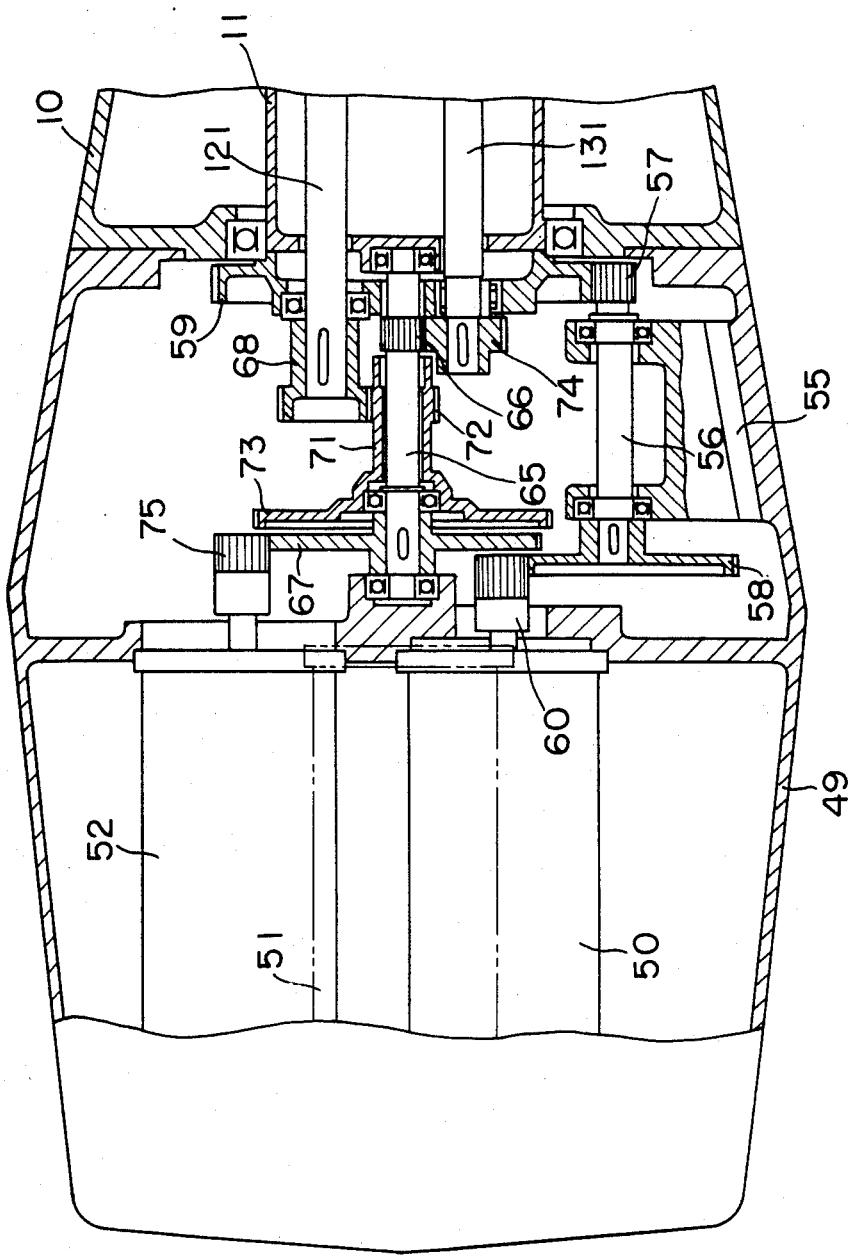
FIG. 7 is a sectional view of the rear half of the third embodiment.

Referring next to FIGS. 6 and 7, a third embodiment of the present invention is shown, wherein the second and third shafts 12 and 13 are carried in the rear casing 15 to be rotatable about their axes m1 and n1 which are radially offset by the amounts (e1) and (e2) from the axis L1 of the first hollow shaft 11, respectively. First and second intermediate shafts 121 and 131 are rotatably carried in the first hollow shaft 11, with their axes extending eccentrically from, and symmetrically with, the axis L1 of the first hollow shaft 11. The second hollow shaft 12 and the first intermediate shaft 121 are connected by a first constant velocity joint 122, while the third shaft 13 and the second intermediate shaft 131 are connected by a second constant velocity joint 132.

FIG. 7 shows a drive mechanism for the third embodiment. This drive mechanism is substantially the same as that of the first embodiment except for the following minor differences. That is, in the drive mechanism of the third embodiment, the transmission shaft 65 rotatably interposed between the first hollow shaft 11 and the housing 49 serves for transmitting rotation from the third drive motor 52 to the second intermediate shaft 131, whereas the transmission sleeve 71 rotatable on the transmission shaft 65 serves for transmitting rotation from the second drive motor 51 to the first intermediate shaft 121. Accordingly, the transmission shaft 65 and the transmission sleeve 71 in this embodiment respectively correspond in function to the transmission sleeve 71 and the transmission shaft 65 in the first embodiment. It is apparent that the third embodiment is more advantageous than the first embodiment in a point that the use of the first and second constant velocity joints 122 and 132 makes the design of the gear trains easy.

Figure 1:
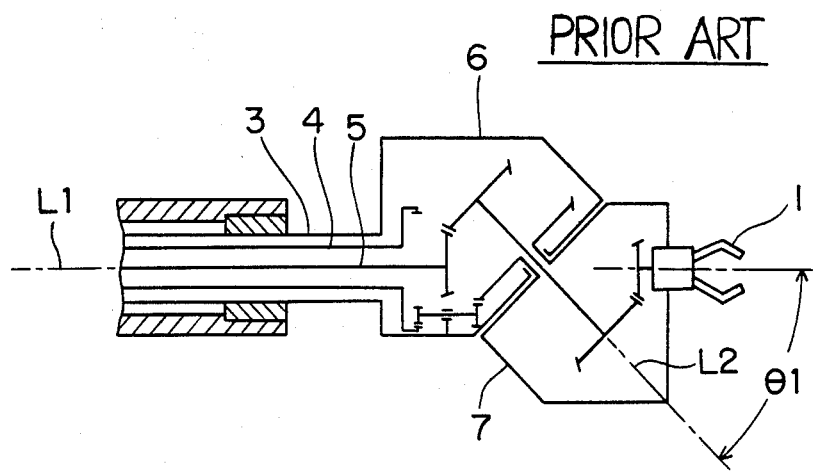
FIG. 1 is a representation illustrating the schematic structure of a prior art manipulation arm mechanism.
Figure 9:
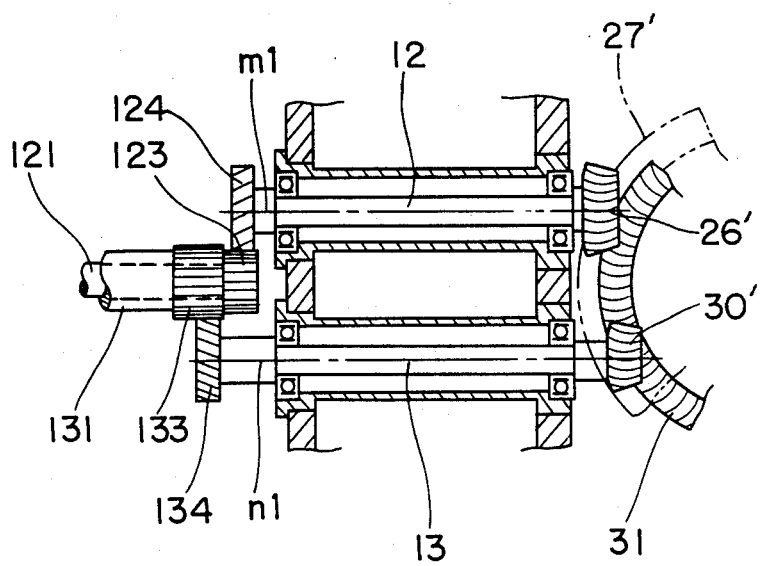
FIG. 9 is a fragmentary sectional view of the mechanism taken along the line IX—IX in FIG. 8.
Figure 8:
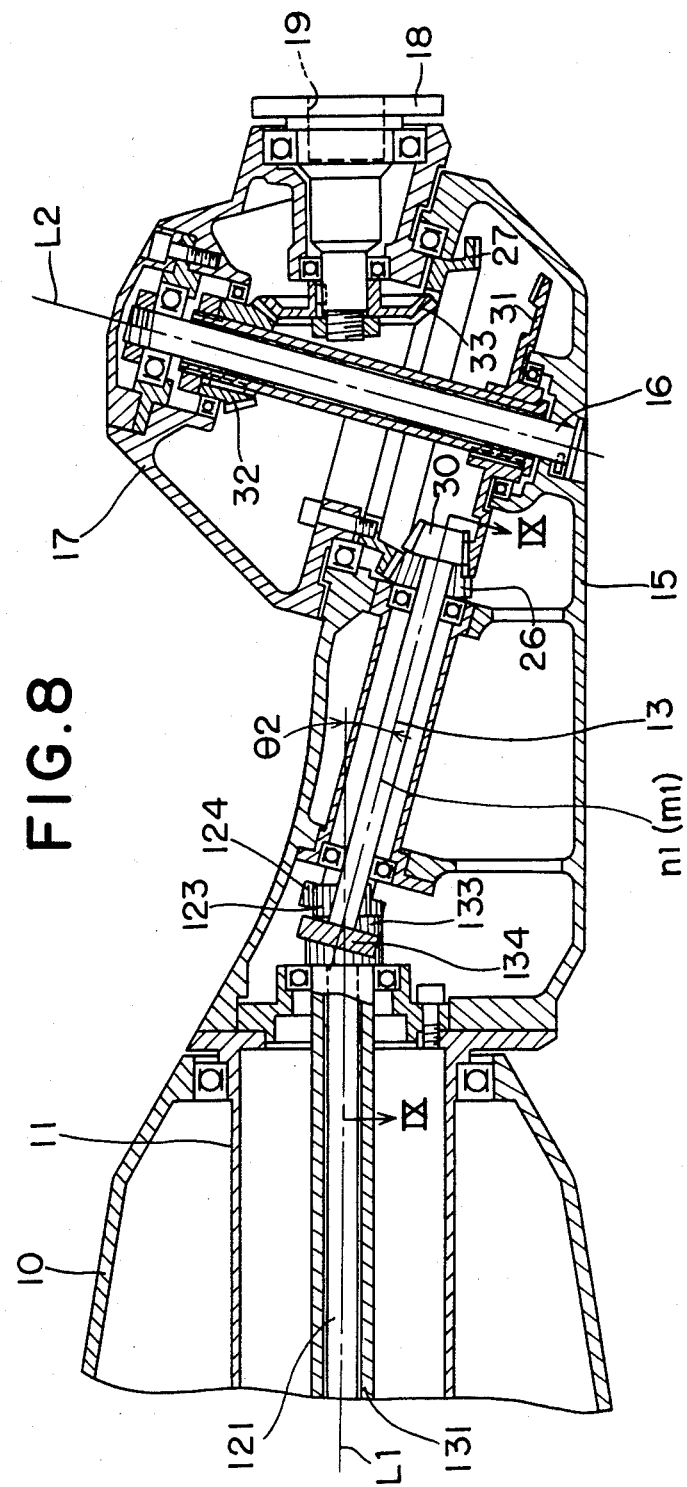
FIG. 8 is a sectional view of the front half of a further manipulation arm mechanism constituting a fourth embodiment of the present invention.
Figure 10:
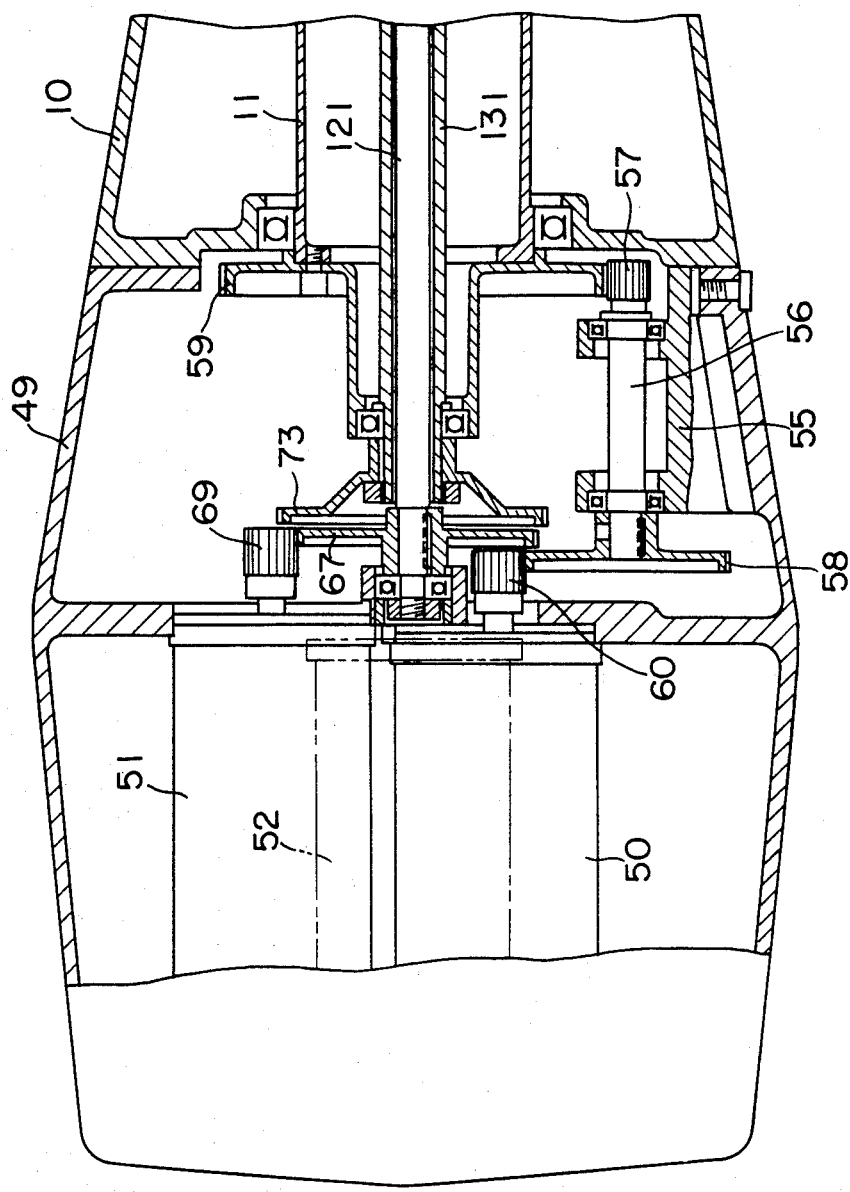
FIG. 10 is a sectional view of the rear half of the fourth embodiment.

Referring then to FIGS. 8-10, a fourth embodiment of the present invention is shown having the second and third shafts 12 and 13, whose axes m1 and n1 are inclined relative to the axis L1 of the first hollow shaft 11 at a predetermined angle ($\theta$2) as seen in FIG. 8, but which extend in parallel relation with each other as seen in FIG. 9. The second intermediate shaft 131 (which is tubular in this embodiment) passes through the first hollow shaft 11 and is co-axially carried therein to be rotatable about the axis L1 of the first hollow shaft 11. The first intermediate shaft 121 passes through the second intermediate shaft 131 in co-axial alignment therewith and is rotatable about the axis L1 of the first hollow shaft 11. The first and second intermediate shafts 121 and 131 are provided at their front ends with spur gears 123 and 133 meshing with helical gears 124 and 134 keyed on the rear ends of the second and third shafts 12 and 13, respectively. In this particular embodiment, the gears 26' and 27' corresponding to the bevel gears 26 and 27 are respectively secured to the second hollow shaft 12 and the front casing 17. The gears 26' and 27' constitute a set of hypoid gears so as to permit the gearing therebetween, as shown in FIG. 9. Likewise, the gears 30' and 31' corresponding to bevel gears 30 and 31 are secured to the third shaft 13 and the head mounting shaft 18. The gears 30' and 31' similarly constitute a set of hypoid gears so as to permit the gearing therebetween.

Further, the gear 67 keyed on a rear end of the first intermediate shaft 121 meshes with the gear 69 driven by the second drive motor 51. Similarly, the gear 73 keyed on a rear end of the second intermediate shaft 131 meshes with the gear 75 (not shown in FIG. 10) driven by the third drive motor 52. Accordingly, rotation of the second drive motor 51 is transmitted to the front casing 17 via the first intermediate hollow shaft 121 and the second shaft 12 and the gears 69, 67, 123, 124, 26 and 27, and rotation of the third drive motor 52 is transmitted to the head mounting shaft 18 via the second intermediate shaft 131 and the third shaft 13 and the gears 75, 73, 133, 134 and 30-33.

As is apparent from the foregoing, the fourth embodiment features the inclined disposition of the second and third shafts 12 and 13. This unique configuration makes it possible to arrange the first and second intermediate shafts 121 and 131 in co-axial alignment with the first hollow shaft 11. Consequently, an unbalance which might occur where the first and second intermediate shafts 121 and 131 are eccentric from the first shaft axis L1 as is true in the first embodiment, can be completely avoided, and as shown in FIG. 10, the drive mechanism therefor can be simplified in construction compared with that of the first embodiment.

FIGS. 11-13 are illustrative of a backlash elimination mechanism which is incorporated into the drive mechanism used in the aforementioned first embodiment. As best shown in FIGS. 11 and 12, each of first and second bearing supports 80 and 81 has a generally round external surface and is formed at a portion thereof with a slit 84 (or 85) extending in an axial direction thereof. The portion 86 (or 87) of each bearing support 80 (or 81) which is diametrically opposed to the corresponding slit 84 (or 85) is made thin for elastic deformation. Thus, the deformable portion 86 enables a bearing portion 88 rotatably carrying the above-noted second shaft 12, to be movable radially of the above-noted transmission shaft 65. Likewise, the deformable portion 87 enables a bearing portion 89 rotatably carrying the above-noted third shaft 13, to the movable radially of the above-noted transmission shaft 65. A set of draw and push bolts 90, 91 is arranged in the bearing support 80 for adjusting the width of the slit 84, and another set of draw and push bolts 92 and 93 is arranged in the bearing support 81 for adjusting the width of the slit 85. The bearing portions 88, 89 are normally mounted on the gear 59 by means of securing bolts 83 passing through clearance holes in the first and second bearing supports 80, 81. However, the securing bolts 83 are, of course, loosened prior to adjustment of the backlash elimination mechanism, and the clearance holes in the first and second bearing supports 80, 81 accommodate the motion of the bearing portions 88, 89 relative to the gear 59.

Accordingly, when the draw bolt 90 and the push bolt 91 are properly adjusted, the width of the slit 84 is changed through elastic deformation of the deformable portion 86, whereby a backlash between the gears 66 and 68 can be eliminated. The proper adjustment of the draw bolt 92 and the push bolt 93 results in eliminating the backlash between the gears 72 and 74 in the same manner.

In order to eliminate the backlash between the gears 59 and 57, another backlash elimination mechanism is further provided, wherein the above-noted eccentric sleeve 55 is formed so as to have a semicircular cut-out 62 at its mid portion, as clearly understood from FIGS. 3 and 11. A pair of push bolts 63 screwed into the housing 49 are in abutting engagement respectively with dimetrically opposed bottom surfaces of the cut-out 62. Since the eccentric sleeve 55 has a bearing bore which is eccentric from an external surface thereof, the manipulation of the push bolts 63 causes the transmission shaft 56 to turn around the axis of the eccentrics sleeve 55. As a result, the distance between the gears 57 and 59 is varied to eliminate the backlash therebetween.

It is to be noted that although not shown, the backlash between the gear on the output shaft of each drive motor and the gear driven thereby can be eliminated in a well-known manner, e.g., by adjusting the mounting position of the drive motor in a radial direction of the driven gear. It is also to be noted that the backlash between the bevel gears 26 and 27 can be eliminated by chosing the thickness of a spacer (not show) which is interposed between the bevel gear 27 and the front casing 17, and that the backlash in the gear train including the bevel gears 30-33 can be eliminated by screwing up a nut 32a (see FIG. 2).

Figure 15:
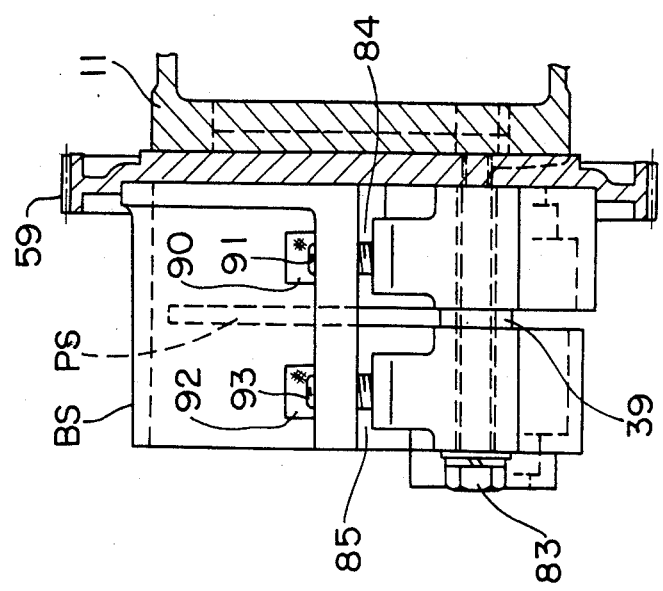
FIG. 15 is an elevational view of the backlash elimination mechanism shown in FIG. 14.
Figure 14:
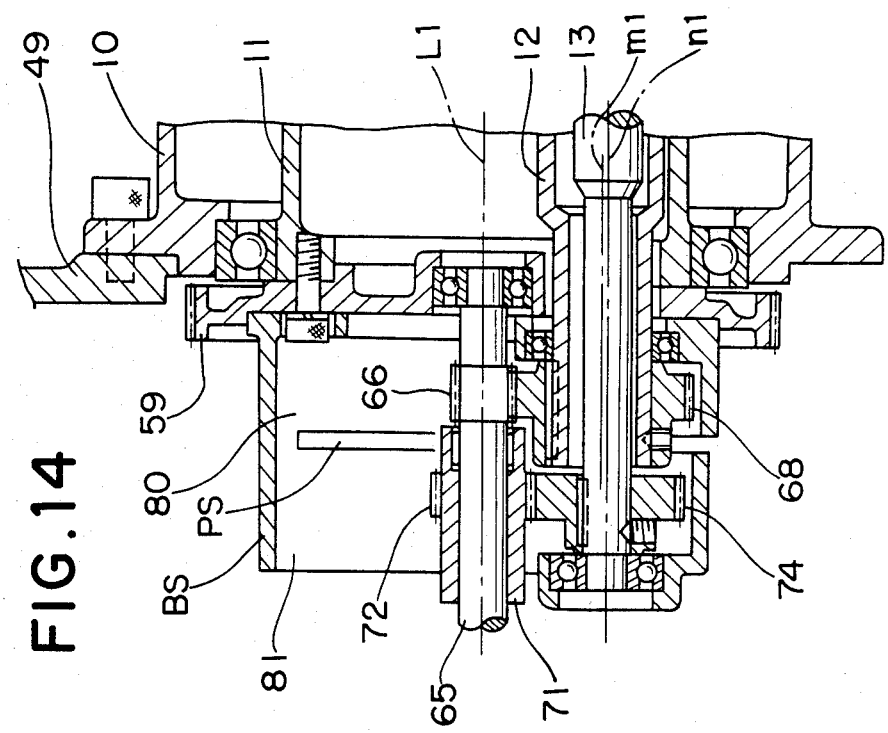
FIG. 14 is a fragmentary sectional view of another backlash elimination mechanism used in place of that shown in FIGS. 11–13.

Referring next then to FIGS. 14 and 15, there is shown another backlash elimination mechanism which can be used in place of the aforementioned mechanism shown in FIGS. 11-13. This another mechanism is improved in that a single bearing support BS performs the same functions as done by the above-noted first and second bearing supports 80 and 81. That is, the bearing support BS is formed at its axial mid portion with a partitioning slit PS which extends within a plane transverse to the axis of the bearing support BS, so as to provide first and second bearing support sections 80' and 81'. This partitioning slit PS permits the first and second bearing support sections 80' and 81' to be radially deformed independently of each other in the same manner as the above-noted first and second bearing supports 80 and 81. Spacers 39 are inserted into the partitioning slit PS, with two securing bolts 83 respectively passing therethrough. These spacers 39 prevent the second bearing support section 81' to be axially deformed when the securing bolts 83 are screwed up after the manipulations of the draw and push bolts 90-93. The manipulation of the draw and push bolts 90 and 91 causes the first bearing support section 80' to be radially deformed, whereby the backlash between the gears 66 and 68 can be eliminated. Similarly, the manipulation of the draw and push bolts 92 and 93 causes the second bearing support section 81' to be radially deformed, whereby the backlash between the gears 72 and 74 can be eliminated. These manipulations are, of course, done with the securing bolts 83 being loosened.

Obviously, various modifications and variations are possible in light of the above teachings. It is therefore to be understood that within the scope of the appended claims, the present invention may be practiced otherwise than as specifically described herein.

What is claimed is:

1. A manipulation arm mechanism for an industrial robot, said mechanism comprising:
    (a) an arm (10) of said industrial robot;
    (b) first to third drive means (50, 51, 52);
    (c) a first shaft (11) rotatably carried within said arm (10) and connected to said first drive means (50) to be driven thereby around an axis (L1);
    (d) a rear casing (15) fixedly mounted on a front end of said first shaft (11);
    (e) a front casing (17) carried on said rear casing (15) for rotation about an oblique axis (L2) slanted relative to the axis (L1) of said first shaft (11);
    (f) a head mounting shaft (18) rotatably carried by said front casing (17) for rotation about an axis (L3), said head mounting shaft being capable of having a working head mounted thereon;
    (g) a second shaft (12) rotatably carried within said rear casing (15), with a front end thereof being offset from the axis (L1) of said first shaft (11) on a first side of the axis (L1) of said first shaft (11), said second shaft being connected to said second drive means (51) to be rotated thereby around an axis (m1);
    (h) a third shaft (13) rotatably carried within said rear casing (15), with a front end thereof being offset from the axis (L1) of said first shaft (11) on the first side by the axis (L1) of said first shaft (11), said third shaft being connected to said third drive means (52) to be rotated thereby around an axis (n1);
    (i) first motion transmission means (26, 27) provided between the front end of said second shaft (12) and said front casing (17) for transmitting rotation from said second shaft (12) to said front casing (17); and
    (j) second motion transmission means (30, 31, 16, 32, 33) provided between the front end of said third shaft (13) and said head mounting shaft (18) for transmitting rotation from said third shaft (13) to said head mounting shaft (18),
    whereby said front casing (17) can be provided back closer to said rear casing (15) on the side of the axis (L1) of said first shaft (11) opposite to said first side thereof than if the front ends of said second and third shafts (12, 13) were not offset from the axis (L1) of said first shaft (11).

2. A manipulation arm mechanism as set forth in claim 1, wherein the axis (L3) of said head mounting shaft (18) is in axial alignment with the axis (L1) of said first shaft (11) only when said front casing (17) is rotated to a predetermined position in which said head mounting shaft (18) is in parallel relation with said first shaft (11).

3. A manipulation arm mechanism as set forth in claim 2, wherein:
   (a) said second shaft (12) is a hollow shaft passing through said rear casing (15);
   (b) the axis (m1) about which said second shaft (12) is rotatable is eccentric (E1) from the axis (L1) of said first shaft (11);
   (c) said third shaft (13) passes through said second shaft (12); and
   (d) the axis (n1) about which said third shaft (13) is rotatable is eccentric (E2) from the axis of said first shaft (11).

4. A manipulation arm mechanism as set forth in claim 3, wherein:
   (a) a housing (49) is secured to the rear end of said arm (10) to accommodate said first to third drive means (50, 51, 52);
   (b) said first to third drive means (50, 51, 52) include:
      (i) first to third drive motors (50, 51, 52) mounted within said housing (49) and
      (ii) first to third gear trains (57, 59; 66, 68; 72, 74) drivingly connecting said first to third drive motors (50, 51, 52) respectively to said first to third drive shafts (11, 12, 13); and
   (c) each of said first to third gear trains (57, 59; 66, 68; 72, 74) includes:
      (i) a driven gear (59, 68, 74) secured to the rear end of a corresponding one of said first to third shafts (11, 12, 13) and
      (ii) a drive gear (57, 66, 72) meshing with a corresponding one of said driven gears for imparting driving power from a corresponding one of said first to third drive motors (50, 51, 52) to said corresponding one of said first to third shafts (11, 12, 13).

5. A manipulation arm mechanism as set forth in claim 4, and further comprising:
   (a) bearing support means (80, 81) secured to the rear end of said first shaft (11) and having first (80) and second (81) sections defined in the axial direction of said first shaft (11);
   (b) first (88) and second (89) bearing support portions formed on said first (80) and second (81) sections for rotatably carrying the rear ends of said second (12) and third (13) shafts, respectively;
   (c) first (86) and second (87) deformable portions formed on said first (80) and second (81) sections for enabling said first and second bearing support portions to be displaced radially of said first shaft (11) when elastically deformed, respectively;
   (d) first adjusting means (90, 91) incorporated in said first section (80) and manually operable for causing elastic deformation of said first deformable portion (86) so as to adjust the gearing between said driven gear (68) secured to the rear end of said second shaft (12) and said drive gear (72) meshing therewith; and
   (e) second adjusting means (92, 93) incorporated in said second section (81) and manually operable for causing electric deformation of said second deformable portion (87) so as to adjust the gearing between said driven gear (66) secured to the rear end of said third shaft (13) and said drive gear (72) meshing therewith.

6. A manipulation arm mechanism as set forth in claim 5, and further comprising:
   (a) an eccentric sleeve (55) carried by said housing (49) for rotation about an axis, said eccentric sleeve (55) having a bearing bore therein that is eccentric from the axis of said eccentric sleeve (55);
   (b) a transmission shaft (56) rotatably carried in said bearing bore of said eccentric sleeve (55) and drivingly connected to said first drive motor (50) to be rotated thereby, said transmission shaft (56) having secured thereto said drive gear (57) which meshes with said driven gear (59) secured to the rear end of said first shaft (11); and
   (c) angle adjusting means (63) incorporated in said gear housing (49) and manually operable for varying the angular position of said eccentric sleeve (55) so as to adjust the gearing between said drive gear (57) which meshes with said driven gear (59) secured to the rear end of said first shaft (11).

7. A manipulation arm mechanism as set forth in claim 5, wherein said first (80) and second (81) sections of said bearing support means (80, 81) are separate members.

8. A manipulation arm mechanism as set forth in claim 5, wherein:
   (a) said bearing support means (80, 81) is formed at its axial mid portion with a partitioning slit (PS) extending in a plane transverse to the axis of said first shaft (11) and
   (b) said partitioning slit (PS) partially separates said first and second sections (80', 81') from each other for permitting said first (86) and second (87) deformable portions to be elastically deformed independently of each other.

9. A manipulation arm mechanism as set forth in claim 3, wherein:
   said third shaft is in co-axial alignment with said second shaft.

10. A manipulation arm mechanism as set forth in claim 2, wherein said second and third shafts are carried within said rear casing and rotatable respectively about their axes which are eccentric from the axis of said first shaft respectively by first and second distances, further comprising:
   first and second intermediate shafts carried within said first shaft to be rotatable about respective axes each being eccentric from the axis of said first shaft and drivingly connected respectively to said second and third drive means to be rotated thereby; and
   first and second universal joints drivingly connecting said first and second intermediate shafts respectively to said second and third shafts.

11. A manipulation arm mechanism as set forth in claim 10, wherein a housing is secured to a rear end of said arm to accommodate at least said second and third drive means, and wherein said second and third drive means include:
   a transmission shaft interposed between the rear end of said first shaft and said housing to be rotatable about its axis being in axial alignment with the axis of said first shaft;
   a transmission sleeve rotatable on said transmission shaft;

drive motors mounted within said housing and respectively drivingly connected to said transmission shaft and said transmission sleeve;

a first pair of gears respectively secured to said transmission shaft and one of said first and second intermediate shafts and meshing with each other; and a second pair of gears respectively secured to said transmission sleeve and the other of said first and second intermediate shafts and meshing with each other.

12. A manipulation arm mechanism as set forth in claim 2, wherein each of said first and second shafts carried within said rear casing is rotatable about an axis thereof inclined at an acute angle relative to the axis of said first shaft, and wherein said first and second motion transmission means respectively include:

a first set of hypoid gears meshing with each other for transmitting rotation from said second shaft to said front casing; and a second set of hypoid gears meshing with each other for transmitting rotation from said third shaft to said head mounting shaft.

13. A manipulation arm mechanism as set forth in claim 12, further comprising:

a hollow intermediate shaft co-axially carried within said first shaft and drivingly connected to said third drive means to be rotated thereby;

a pair of spur and helical gears meshing with each other and respectively secured to said hollow intermediate shaft and said third shaft;

another intermediate shaft co-axially carried within said hollow intermediate shaft and drivingly connected to said second drive means to be rotated thereby; and another pair of spur and helical gears meshing with each other and respectively secured to said another intermediate shaft and said second shaft.

14. A manipulation arm mechanism as set forth in claim 5 wherein said axis (L1) of said first shaft (11), said axis (m1) of said second shaft (12), and said axis (n1) of said third shaft (13) are coplanar.

15. A manipulation arm mechanism as set forth in claim 5 wherein said axis (n1) of said third shaft (13) is offset from said axis (L1) of said first shaft (11) by more than said axis (m1) of said second shaft (12) is offset from said axis (L1) of said first shaft (11).

16. A manipulation arm mechanism as set forth in claim 5 wherein said axis (n1) of said third shaft (13) and said axis (m1) of said second shaft (12) are offset from said axis (L1) of said first shaft (11) by different amounts.

* * * * *